United States Patent Office 2,706,199
Patented Apr. 12, 1955

2,706,199

(ORTHO - HYDROXY-CARBOXY)-PHENYL ESTERS OF PHTHALOCYANINE TETRASULPHONIC ACIDS AND A PROCESS FOR MAKING THE SAME

Willy Brentano, Arlesheim, Switzerland, assignor to Durand & Huguenin A. G., Basel, Switzerland No Drawing. Application January 5, 1953, Serial No. 329,727

Claims priority, application Switzerland January 8, 1952

13 Claims. (Cl. 260—314.5)

This invention is for the manufacture of new water-soluble esters of phthalocyanine tetrasulphonic acids, which contain at least one salicylic acid group in the molecule and are blue to green dyestuffs suitable for dyeing or printing textiles.

The new dyestuffs of the invention are (ortho-hydroxy-carboxy)-phenyl esters of phthalocyanine tetrasulphonic acids having the general formula

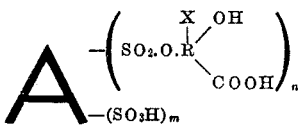

in which A represents a substituted or unsubstituted phthalocyanine molecule free from or containing metal, in which the

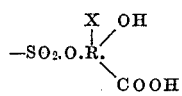

and —SO₃H groups are present either in 3-positions or 4-positions, $m$ represents a number from 0 to 3, $n$ represents a number from 1 to 4, and the sum of $m+n$ equals 4, and R represents a benzene nucleus in which the hydroxyl and carboxylic acid groups are in ortho-position relatively to one another.

The invention also includes a process of making the dyestuffs of the above general formula, wherein one molecular proportion of a phthalocyanine sulphonic acid chloride of the general formula

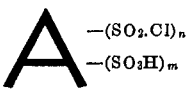

in which A represents a substituted or unsubstituted phthalocyanine molecule free from or containing metal, in which the —SO₂.Cl and —SO₃H groups are present either in 3-positions or 4-positions, $m$ represents a number from 0 to 3, and $n$ represents a number from 1 to 4, and the sum of $m+n$ equals 4, is reacted in an aqueous medium and in the presence of a substance capable of neutralising a mineral acid with at least one, and advantageously three to four, molecular proportions of a dihydroxybenzene carboxylic acid of the general formula

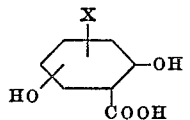

in which X represents hydrogen, halogen, —OH, —CH₃ or —SO₃H.

Among the sulphonic acid chlorides of phthalocyanine tetrasulphonic acids used in the process of the invention there are included those which can be made by the processes hitherto known. Whether the sulphonic acid groups are present in the phthalocyanine molecule in the 4-position or the 3-position depends on the method used for making the sulphonic acid chlorides, that is to say, on whether the 4-sulphophthalic acids are used as starting materials or whether the sulphonic acid chloride groups are introduced by sulphonation or direct sulphochlorination of the phthalocyanine. In the case of phthalocyanines prepared from diphenyl-ortho-dicarboxylic acid, the sulphonic acid chloride groups may be present in the external nuclei. The number of sulphonic acid chloride groups in the molecule may vary from 1 to 4. Usually in preparing sulphonic acid chlorides of phthalocyanine tetrasulphonic acids, and especially in isolating them, there are obtained mixtures of phthalocyanines having different numbers of sulphonic acid chloride groups.

As dihydroxybenzene carboxylic acids for use in the process of the invention, there may be mentioned more especially, for example: 1:4-dihydroxybenzene-5-carboxylic acid (gentisic acid), 3-chloro-1:4-dihydroxybenzene-5-carboxylic acid, 3-bromo-1:4-dihydroxybenzene-5-carboxylic acid, 3-methyl-1:4-dihydroxybenzene-5 - carboxylic acid, 1:4 - dihydroxybenzene-5-carboxylic acid - 3 - sulphonic acid, 1:3-dihydroxybenzene-4-carboxylic acid (β-resorcylic acid), 6-chloro-1:3-dihydroxybenzene-4-carboxylic acid, 6-bromo-1:3-dihydroxybenzene-4-carboxylic acid, 5-methyl-1:3-dihydroxybenzene-4-carboxylic acid, 1:2:3-trihydroxybenzene-4-carboxylic acid (pyrogallol carboxylic acid), 1:2-dihydroxybenzene-3-carboxylic acid, 1:2-dihydroxybenzene-3-carboxylic acid-5-sulphonic acid and the like.

The invention also includes the reaction of a mixture of at least two different dihydroxybenzene carboxylic acids with a sulphonic acid chloride of a phthalocyanine tetrasulphonic acid.

The reaction of the sulphonic acid chlorides with the dihydroxybenzene carboxylic acids is carried out in an aqueous medium and in the presence of at least one substance capable of neutralising a mineral acid such, for example, as an alkali or alkaline earth metal hydroxide or carbonate, an alkali bicarbonate, magnesium oxide or carbonate, sodium acetate, ammonia, triethanolamine, dimethyl-formamide, pyridine or the like.

The reaction temperature may vary within very wide limits, but it is of advantage to work at room temperature. Hydrolysis of the sulphonic acid chloride groups can be checked more or less strongly depending on the choice of the reaction temperature and the substance capable of neutralising a mineral acid.

In many cases it is uncertain whether the sulphonic acid chloride groups are wholly or only partially esterfied by the process of the invention.

The various sulphonic acid chlorides used in the process of the invention may be brought into reaction with at least one, and advantageously several, molecular proportions of dihydroxybenzene carboxylic acids. Thus, for example, 1 mol of a phthalocyanine tetrasulphonic acid chloride may be reacted with one, two, three or four mols of a dihydroxybenzene carboxylic acid. For practical reasons it may be desirable to use a slight excess of the dihydroxybenzene carboxylic acid.

Depending on the choice of the phthalocyanine sulphonic acid chloride and the number (1 to 4) of mols of the dihydroxybenzene carboxylic acid that enter into reaction, there are obtained dyestuffs having different tinctorial properties. Thus, the larger the number of sulphonic acid groups in the dyestuff molecule the more pronounced is the substantive character of the dyestuff, and the greater the number of (ortho-hydroxy-carboxy)-phenyl ester groups present in the dyestuff molecule the more pronounced is the mordant character of the dyestuff.

The alkali salts of the (ortho-hydroxy-carboxy)-phenyl esters of the phthalocyanine tetrasulphonic acids are easily soluble in water, and are suitable for dyeing or printing vegetable, animal or wholly synthetic fibres, and also for dyeing oxidic protective coatings on aluminium.

Owing to the presence of at least one, and preferably several salicylic acid groups in the dyestuff molecule it is possible to fix the dyestuffs on the fibre in the form of chromium lakes by known methods.

The new dyestuffs are especially suitable for chrome printing on cotton. The mordant character of the phthalocyanine dyestuffs of the invention increases as the number of salicylic acid groups increases, and this is clearly evident from the increasing improvement in the properties of wet fastness.

Blue to green dyeings are produced which are in part distinguished by remarkable properties of wet fastness and excellent fastness to light.

Furthermore, if the new dyestuffs contain a sufficient number of groups capable of combining with mordants, they can be fixed on textile fibres by an aftertreatment with metal-yielding substances, if desired together with high molecular basic substances, according to known methods. In particular, blue to bluish green dyeings which are distinguished by a good fastness to washing and to light are obtained by after-treatment of prints on cellulosic fibres or fibres of regenerated cellulose with copper-yielding substances together with high molecular basic condensation products.

It is known that phthalocyanine sulphonic acid chlorides are suitable for the production of dyestuffs of the phthalocyanine series, because the chlorine atom can be readily exchanged for other groups. Thus, for example, the reaction of phthalocyanine sulphonic acid chlorides with alcohols or phenols is described in United States Patent No. 2,219,330. Depending on the combination of components and reaction conditions chosen, the reaction leads either to pigment dyestuffs or water-soluble dyestuffs which are all more or less suitable only for dyeing, and not suitable for after-treatment with metal salts and not at all suitable for chrome printing on cotton. None of these dyestuffs possesses any mordant character.

It could not be foreseen that the phthalocyanine sulpho- they can be fixed on textile fibres by an after-treatment chlorides would react with dihydroxybenzene carboxylic acids with the retention of the valuable salicylic acid groups to form the ortho-hydroxy-carboxyphenyl esters of the present invention.

The following examples illustrate the invention, without limiting the same, the parts being by weight:

*Example 1*

96.9 parts (1/10 mol) of freshly prepared copper phthalocyanine tetrasulphonic acid chloride (crude product), obtained by reacting copper phthalocyanine with chlorosulphonic acid, are discharged on to ice and the precipitated reaction product is mixed in the form of a moist paste with 300 parts of broken ice. A solution of 65 parts of 1:3-dihydroxybenzene-4-carboxylic acid (4/10 mol) and 34 parts of sodium hydroxide (100 per cent. strength) in 300 parts of water is rapidly added, while stirring, and stirring is continued at 5–10° C. until the initial strongly alkaline reaction to phenolphthalein paper has disappeared and dissolution has occurred. After acidification with hydrochloric acid the precipitated dyestuff is separated, redissolved in water and sodium carbonate, and the sodium salt of the dyestuff is salted out with sodium chloride. The sodium salt of the 3'-hydroxy-4'-carboxyphenyl ester of copper phthalocyanine-3:3':3":3'''-tetrasulphonic acid having the formula

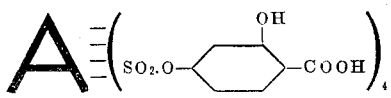

obtained in good yield is a steel blue powder which dissolves in water with a greenish blue coloration and in concentrated sulphuric acid with a green coloration.

The new dyestuff is suitable for dyeing cotton, or viscose, and also for dyeing wool. Blue dyeings are obtained having moderate properties of wet fastness and good fastness to light. When these dyeings are afterchromed on cotton or wool, there are obtained substantially more powerful blue tints which are distinguished by good properties of wet fastness and very good fastness to light. The dyestuff is especially suitable for chrome printing on cotton, in which case full and bright turquoise blue prints are obtained having remarkable properties of wet fastness and excellent fastness to light. The dyestuff is also suitable for dyeing oxidic protective layers of aluminium.

Instead of the sodium salt, the potassium, lithium or ammonium salt can be prepared and used with equal success.

The same dyestuff having the same tinctorial properties is obtained by working at room temperature or 50–60° C., instead of at 5–10° C. as described in this example. There may also be used, with equal success, instead of 34 parts of sodium hydroxide (100 per cent. strength), 65 parts of sodium carbonate (100 per cent. strength), 100 parts of sodium bicarbonate (100 per cent. strength) or 330 parts of a concentrated aqueous solution of ammonia.

*Example 2*

29 parts of copper phthalocyanine tetrasulphonic acid chloride (3/100 mol), obtained as described in Example 1, are discharged on to ice and the separated reaction product is mixed in the form of a moist paste with 150 parts of broken ice, and a solution of 4.8 parts of 1:3-dihydroxybenzene-4-carboxylic acid (3/100 mol) and 2.4 parts of sodium hydroxide (100 per cent. strength) in 100 parts of water is added while stirring. After stirring the mixture for several hours at room temperature dissolution is complete. The mixture is acidified with hydrochloric acid, the precipitated dyestuff is separated, dissolved in water and sodium carbonate, and the accurately neutralised dyestuff solution is evaporated to dryness. The resulting sodium salt of the dyestuff yields in chrome printing on cotton, blue tints having moderate properties of wet fastness and good fastness to light.

By reacting under the same conditions, instead of 4.8 parts (3/100 mol) of 1:3-dihydrobenzene-4-carboxylic acid, 9.6 parts (6/100 mol) or 14.2 parts (9/100 mol) or 19.2 parts (12/100 mol) of 1:3-dihydroxybenzene-4-carboxylic acid there are obtained dyestuffs which yield dyeings, for example, on previously chromed cotton or in chrome printing on cotton with different degrees of wet fastness.

In the following table is shown how certain properties of wet fastness show a distinct increase as the number of salicylic acid groups in the dyestuff molecule increases:

| Copper phthalocyanine tetrasulphochloride (3/100 mol) | 1:3-Dihydroxybenzene-4-carboxylic acid, Mol | | | |
|---|---|---|---|---|
| 2 percent. dyeings and prints | 3/100 | 6/100 | 9/100 | 12/100 |
| Dyeings on pre-chromed cotton: Fastness to washing B | 2 | 3 | 4 | 4–5 |
| Chrome print on cotton: Fastness to soaping at 100° C | 1 | 2 | 3 | 4–5 |

*Example 3*

48.5 parts of copper phthalocyanine tetrasulphochloride (1/20 mol), obtained as described in Example 1, are discharged on to ice and the separated reaction product is mixed in the form of a moist paste with 200 parts of broken ice, and a suspension containing 32.5 parts (4/20 mol) of 1:3 dihydroxybenzene-4-carboxylic acid, 26 parts of magnesium carbonate and 300 parts of water is added at 10–15° C. while stirring. The temperature is allowed to rise to 20–25° C. after about 3 hours, and stirring is continued for a further 12 hours. When the reaction is finished the mixture is acidified with hydrochloric acid, the precipitated dyestuff acid is well washed with water and converted into its sodium salt in the usual manner. The dyestuff so obtained is identical with the dyestuff described in Example 1 and has the same tinctorial properties.

Instead of magnesium carbonate there may be used with equal success a corresponding amount of magnesium oxide, calcium hydroxide, calcium carbonate, barium hydroxide or barium carbonate.

*Example 4*

48.5 parts of copper phthalocyanine tetrasulphochloride (1/20 mol) are treated in a manner analogous to that described in Example 1, and the paste so obtained is reacted with an ice-cold solution of 32.5 parts (4/20 mol) of 1:3-dihydroxybenzene-4-carboxylic acid and 100 parts of triethanolamine in 100 parts of water. After stirring for 15 hours at 10–15° C. the mixture is acidified with hydrochloric acid, and the precipitated dyestuff is converted into its sodium salt in the usual manner.

The dyestuff is identical with that described in Example 1.

*Example 5*

48.5 parts of copper phthalocyanine tetrasulphochloride (1/20 mol) are treated in a manner analogous to that described in Example 1, and the paste so obtained is introduced into a solution consisting of 37 parts (4/20 mol) of the sodium salt of 1:3-dihydroxybenzene-4-carboxylic acid and 100 parts of pyridine in 100 parts of water, and the whole is stirred for 12 hours at 20–25° C. The dyestuff acid is separated in the usual manner and converted into its sodium salt. The dyestuff formed is identical with the dyestuff described in Example 1.

Instead of 100 parts of pyridine there may be used 54 parts of sodium acetate.

Example 6

46.6 parts (½₀ mol) of finely pulverised copper phthalocyanine disulphonic acid chloride disulphonic acid (obtained by partially hydrolysing the copper phthalocyanine tetrasulphochloride described in Example 1) are introduced in portions into a solution of 17 parts of 1:3-dihydroxybenzene-4-carboxylic acid (²⁰⁄₂₀ mol) and 18 parts of sodium hydroxide (100 per cent, strength) in 300 parts of water, and the whole is stirred for several hours at 20° C. When the reaction is finished, the mixture is acidified and the precipitated dyestuff is converted into its sodium salt. The new dyestuff is a blue-green powder which dissolves in water with a blue coloration and in concentrated sulphuric acid with a yellow-green coloration.

The new dyestuff yields on pre-chromed cotton a greenish blue tint having good properties of wet fastness and good fastness to light. In chrome printing on cotton there are obtained turquoise blue tints having good properties of wet fastness and very good fastness to light.

Example 7

Copper phthalocyanine tetrasulphochloride is prepared by introducing 89.5 parts (¹⁄₁₀ mol) of copper phthalocyanine tetrasulphonic acid (obtained by sulphonating copper phthalocyanine with oleum) into 1200 parts of chlorosulphuric acid and stirring the mixture for a few hours at 135° C. After cooling, the reaction product is poured on to broken ice, and the precipitated sulphochloride is separated and stirred with 300 parts of broken ice, and mixed at 5–10° C. with a solution of 65 parts (⁴⁄₁₀ mol) of 1:3-dihydroxybenzene-4-carboxylic acid and 34 parts of sodium hydroxide (100 per cent. strength) in 300 parts of water. When the reaction is finished, the dyestuff acid is separated by acidifying the solution and converted into its sodium salt.

The dyestuff so obtained is a grey-blue powder which dissolves in water with a blue coloration and in concentrated sulphuric acid with a yellow green coloration, and has the same tinctorial properties as the dyestuff described in Example 1.

Example 8

96.9 parts (¹⁄₁₀ mol) of copper phthalocyanine-4 4':4'':4'''-tetrasulphochloride (obtained by the action of chlorosulphonic acid on copper phthalocyanine-4:4':4'':4'''-tetrasulphonic acid) are mixed well with 300 parts of broken ice, and a solution of 65 parts (⁴⁄₁₀ mol) of 1:3-dihydroxybenzene-4-carboxylic acid and 34 parts of sodium hydroxide (100 per cent. strength) in 300 parts of water is added while stirring. The reaction mixture is stirred for 8 hours while cooling with ice and then for a further 12–15 hours at 20–25° C. until dissolution is complete. The dark blue clear solution so obtained is acidified with hydrochloric acid, and the precipitated dyestuff acid is separated and converted into its sodium salt.

The resulting sodium salt of the 3'-hydroxy-4'-carboxyphenyl ester of copper phthalocyanine-4:4':4'':4'''-tetrasulphonic acid having the formula

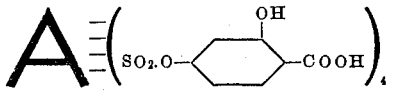

is obtained in good yield and constitutes a blue-violet powder which dissolves in water with a deep blue coloration and in concentrated sulphuric acid with a bright green coloration.

The new dyestuff is suitable for dyeing cotton, viscose and wool. There are obtained greenish blue tints having moderate properties of wet fastness and good fastness to light. On pre-chromed cotton considerably more powerful tints are obained, and a distinct improvement in the properties of wet fastness and fastness to light is obtained. The dyestuff is especially suitable for chrome printing on cotton, whereby powerful blue tints having very good properties of wet fastness and excellent fastness to light are obtained.

On anodically oxidised aluminum the dyestuff yields a bluish green tint.

Example 9

29 parts of copper phthalocyanine-4:4':4'':4'''-tetrasulphochloride (³⁄₁₀₀ mol), obtained as described in Example 8, are mixed with 150 parts of broken ice and a solution of 4.8 parts of 1:3-dihydroxybenzene-4-carboxylic acid (³⁄₁₀₀ mol) and 2.4 parts of sodium hydroxide (100 per cent. strength) in 100 parts of water is added while stirring. The whole is stirred for several hours at room temperature, and the clear solution is acidified with hydrochloric acid, and the precipitated dyestuff is separated, and dissolved in water and sodium carbonate, and the accurately neutralised dyestuff solution is evaporated to dryness. The resulting sodium salt of the dyestuff yields in chrome printing on cotton blue tints of moderate wet fastness properties and good fastness to light.

By reacting, instead of 4.8 parts (³⁄₁₀₀ mol) of 1:3-dihydroxybenzene-4-carboxylic acid, 9.6 parts (⁶⁄₁₀₀ mol) or 14.2 parts (⁹⁄₁₀₀ mol) of 1:3-dihydroxybenzene-4-carboxylic acid under the same conditions, dyestuffs are obtained which for example, in dyeing on pre-chromed cotton or in chrome printing on cotton yield different degrees of wet fastness.

In a manner analogous to that described in Example 2, the improvement in wet fastness increases with the number of salicylic acid groups in the dyestuff molecule.

Example 10

64.2 parts (½₀ mol) of brominated copper phthalocyanine tetrasulphochloride (obtained by the action of chlorosulphonic acid on brominated copper phthalocyanine tetrasulphonic acid, and containing 14.5 per cent of bromine by analysis) are discharged on to ice, the precipitated reaction product is mixed with 200 parts of broken ice, and a solution of 32.5 parts (⁴⁄₂₀ mol) of 1:3-dihydroxybenzene-4-carboxylic acid and 17 parts of sodium hydroxide (100 per cent strength) in 250 parts of water is added while stirring. After stirring for several hours at 10–15° C. dissolution is complete. After acidification with hydrochloric acid, the precipitated dyestuff acid is separated and converted into its sodium salt.

The new dyestuff is a grey-blue powder which dissolves in water with a blue coloration and in concentrated sulphuric acid with an olive-green coloration, and when applied to pre-chromed cotton, yields bluish green tints having very good properties of wet fastness and fastness to light. In chrome printing on cotton pure greenish blue tints of very good fastness are obtained.

Instead of brominated copper phthalocyanine tetrasulphochloride, there may be used tetraphenyl-copper phthalocyanine tetrasulphochloride.

Example 11

A mixture of 48.5 parts (½₀ mol) of copper phthalocyanine tetrasulphochloride (obtained as described in Example 1) with 200 parts of broken ice is mixed with a solution of 49 parts (⁴⁄₂₀ mol) of 6-bromo-1:3-dihydroxybenzene-4-carboxylic acid and 23.5 parts of potassium hydroxide (100 per cent strength) in 400 parts of water, and the mixture is stirred for several hours at 20–25° C. until dissolution is complete. The dyestuff is isolated in the form of its potassium salt by salting out with potassium chloride. The new dyestuff dissolves in water with a blue coloration and in concentrated sulphuric acid with a yellow-green coloration.

In chrome printing on cotton it yields a turquoise blue tint having very good properties of fastness.

Example 12

48.5 parts (½₀ mol) of copper phthalocyanine tetrasulphochloride (obtained as described in Example 1) are charged on to ice, the precipitated reaction product is mixed with 200 parts of broken ice, and a solution of 32.5 parts (⁴⁄₂₀ mol) of 1:4-dihydroxybenzene-5-carboxylic acid (gentisic acid) and 17 parts of sodium hydroxide (100 per cent strength) in 250 parts of water is added while stirring, and the mixture is stirred for 5 hours at 0–5° C. and for a further 10 hours at 15–20° C. The dyestuff is isolated in the form of its sodium salt from the clear solution by salting out with sodium chloride. It is a blue-violet powder which dissolves in water with a bright blue coloration and in concentrated sulphuric acid with a yellow green coloration. The dyestuff is well suited for dyeing cotton, viscose and nylon, and also for dyeing pre-chromed cotton and chromed wool. There are obtained blue-green tints having very good properties of wet fastness and an excellent fastness to light. In chrome printing on cotton there are obtained turquoise blue tints having excellent properties of fastness.

By using for the reaction, instead of 32.5 parts of 1:4-dihydroxybenzene-5-carboxylic acid, 39.5 parts of 3-chloro-1:4-dihydroxybenzene-5-carboxylic acid or 49 parts of 3-bromo-1:4-dihydroxybenzene-5-carboxylic acid or 34 parts of 3-methyl-1:4-dihydroxybenzene-5-carboxylic acid, there are obtained dyestuffs having similar tinctorial properties.

Example 13

A mixture of 48.5 parts (1/20 mol) of copper phthalocyanine tetrasulphochloride with 200 parts of broken ice (obtained as described in Example 1) is mixed well with a solution of 49 parts (4/20 mol) of 1:2-dihydroxybenzene-3-carboxylic acid-5-sulphonic acid and 26 parts of sodium hydroxide (100 per cent strength) in 350 parts of water, the mixing being advantageously carried out with the exclusion of atmospheric oxygen. The mixture is stirred for several hours at 0–5° C. until dissolution is complete. The sodium salt of the dyestuff is obtained in the manner described above.

The new dyestuff is a blue-grey powder which dissolves in water with a blue coloration and in concentrated sulphuric acid with a yellow-green coloration.

In chrome printing on cotton there are obtained greenish blue tints having good properties of fastness.

A similar result is obtained by using 1:4-dihydroxybenzene-5-carboxylic acid-3-sulphonic acid, instead of 1:2-dihydroxybenzene-3-carboxylic acid-5-sulphonic acid.

Example 14

48.5 parts (1/20 mol) of copper phthalocyanine tetrasulphochloride are mixed as described in Example 1 with 200 parts of broken ice and with a solution of 36 parts (4/20 mol) of 1:2:3-trihydroxybenzene-4-carboxylic acid (pyrogallol carboxylic acid) and 26 parts of sodium hydroxide (100 per cent strength) in 350 parts of water, and the mixture is stirred for several hours at 0–5° C. When the reaction is finished, the product is worked up as described above and the sodium salt of the dyestuff is isolated and purified.

The new dyestuff is a grey-black powder which dissolves in water with a greenish blue coloration and in concentrated sulphuric acid with an olive-green coloration.

It yields on pre-chromed cotton a powerful bluish green tint, and in chrome printing on cotton blue-green tints having good fastness properties are obtained.

Example 15

A mixture of 48.5 parts (1/20 mol) of copper phthalocyanine tetrasulphochloride with 200 parts of broken ice (obtained as described in Example 1) is mixed with a solution of 16 parts (2/20 mol) of 1:3-dihydroxybenzene-4-carboxylic acid, 16 parts (2/20 mol) of 1:4-dihydroxybenzene-5-carboxylic acid and 7 parts of sodium hydroxide (100 per cent strength) in 250 parts of water, and the whole is stirred for 11 hours at 10–15° C. until dissolution is complete. The dyestuff is isolated in the form of its sodium salt. It is a grey-violet powder which dissolves in water with a blue coloration and in concentrated sulphuric acid with a yellow-green coloration.

It yields on pre-chromed cotton and on wool by after-chroming full bluish green tints, and in chrome printing on cotton greenish blue tints having good fastness properties. It dyes nylon blue-green tints and anodically oxidised aluminium greenish blue tints.

Example 16

45.3 parts (1/20 mol) of phthalocyanine tetrasulphochloride (obtained by the action of chlorosulphonic acid on phthalocyanine) are discharged on to ice, and the precipitated reaction product is mixed in the form of a moist paste with 200 parts of broken ice, and a solution of 32.5 parts (4/20 mol) of 1:3-dihydroxybenzene-4-carboxylic acid and 17 parts of sodium hydroxide (100 per cent. strength) in 200 parts of water is added. The whole is stirred for several hours at 0–5° C., and the dyestuff acid is precipitated from the clear solution by means of hydrochloric acid and converted into its sodium salt in the usual manner. The new dyestuff is a blue-grey powder which dissolves in water with a pale blue coloration and in concentrated sulphuric acid with an olive-green coloration.

It dyes pre-chromed cotton bluish green tints, and in chrome printing on cotton yields green tints having good properties of fastness.

Example 17

96.5 parts (1/10 mol) of freshly prepared cobalt phthalocyanine tetrasulphochloride (obtained by the action of chlorosulphonic acid on cobalt phthalocyanine) are discharged on to ice, and the separated reaction product is mixed in the form of a moist paste with 300 parts of broken ice, and a solution of 65 parts (4/10 mol) of 1:3-dihydroxybenzene-4-carboxylic acid and 34 parts of sodium hydroxide (100 per cent. strength) in 350 parts of water is added. After stirring the whole for several hours at room temperature, the dyestuff is isolated in the form of its sodium salt as described in Example 1.

The sodium salt of the resulting 3'-hydroxy-4'-carboxyphenyl ester of cobalt phthalocyanine-3:3':3'':3'''-tetrasulphonic acid having the formula

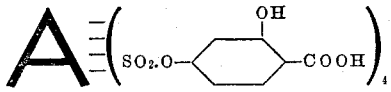

is a grey-blue powder which dissolves in water with a dark blue coloration and in concentrated sulphuric acid with a blue-green coloration.

In chrome printing on cotton it yields bright blue-green tints of which some of the properties of fastness are very good and of which the fastness to light is very good.

Example 18

48.2 parts (1/20 mol) of nickel phthalocyanine tetrasulphochloride (obtained by the action of chlorosulphonic acid on nickel phthalocyanine) are discharged on to ice, and the separated reaction product is mixed in the form of a moist paste with 200 parts of broken ice, and a solution of 32.5 parts (4/20 mol) of 1:4-dihydroxybenzene-5-carboxylic acid and 23.5 parts of potassium hydroxide (100 per cent. strength) in 250 parts of water is added. After stirring for several hours at 10–15° C., the dyestuff is isolated in the form of its potassium salt.

The potassium salt of the resulting 4'-hydroxy-3'-carboxyphenyl ester of nickel phthalocyanine-3:3':3'':3'''-tetrasulphonic acid having the formula

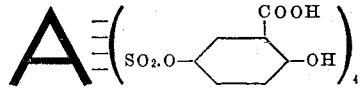

is a dark violet powder which dissolves in water with a blue-green coloration and in concentrated sulphuric acid with a yellow-green coloration.

The new dyestuff dyes wool from an acid bath blue-green tints having fairly good fastness properties, which undergo improvement when after-chromed. On pre-chromed cotton there is obtained a blue-green tint and in chrome printing on cotton a bright greenish blue tint having very good properties of fastness.

Instead of 1:4-dihydroxybenzene-5-carboxylic acid, there may be used with similar success 1:3-dihydroxybenzene-4-carboxylic acid.

Example 19

47.9 parts (1/20 mol) of chromium phthalocyanine tetrasulphochloride (obtained by the action of chlorosulphonic acid on chromium phthalocyanine) are discharged on to ice, and the separated reaction product is mixed in the form of a moist paste with 200 parts of broken ice, and a solution of 32.5 parts (4/20 mol) of 1:3-dihydroxybenzene-4-carboxylic acid and 23.5 parts of potassium hydroxide (100 per cent. strength) in 250 parts of water is added. After stirring the whole for several hours at 10–15° C., the dyestuff is isolated in the form of its sodium salt as described in Example 1.

The sodium salt of the resulting 3'-hydroxy-4'-carboxyphenyl ester of chromium phthalocyanine tetrasulphonic acid is a dark green powder which dissolves in water with a blue green coloration and in concentrated sulphuric acid with a yellow-brown coloration.

In chrome printing on cotton there is obtained a pure green tint having very good properties of fastness.

Instead of 1:3-dihydroxybenzene-4-carboxylic acid there may be used 1:4-dihydroxybenzene-5-carboxylic acid.

Example 20

93.3 parts (1/10 mol) of aluminum phthalocyanine tetrasulphochloride (obtained by the action of chlorsulphonic acid on aluminum phthalocyanine) are discharged on to ice, and the separated reaction product is mixed in the form of a moist paste with 300 parts of broken ice and a solution of 65 parts (4/10 mol) of 1:3-dihydroxybenzene-4-carboxylic acid and 34 parts of sodium hydroxide (100 per cent. strength) in 300 parts of water is added. After stirring the whole for several hours at room temperature the dyestuff is isolated in the form of its sodium salt as described in Example 1.

The sodium salt of the resulting 3'-hydroxy-4'-carboxyphenyl ester of aluminum phthalocyanine tetrasulphonic acid is a blue-green powder which dissolves in water with a blue coloration and in concentrated sulphuric acid with a green coloration.

The new dyestuff is suitable for dyeing wool, natural silk, cotton and viscose. By after-treatment with a metal salt the properties of wet fastness are in part considerably improved. In chrome printing on cotton there is obtained a pure greenish blue tint having very good properties of fastness.

Example 21

96.4 parts (1/10 mol) of nickel phthalocyanine-4:4':4":4'''-tetrasulphochloride (obtained by the action of chlorosulphonic acid on nickel phthalocyanine-4:4':4":4'''-tetrasulphonic acid) are mixed with 300 parts of broken ice and a solution of 65 parts (4/10 mol) of 1:4-dihydroxybenzene-5-carboxylic acid and 34 parts of sodium hydroxide (100 per cent. strength) in 350 parts of water is added while stirring. The whole is stirred for several hours at 10–20° C. until dissolution is complete, and the dyestuff is isolated by acidification with hydrochloric acid and converted into its sodium salt. The sodium salt of the 4'-hydroxy-3'-carboxyphenyl ester of nickel phthalocyanine-4:4':4":4'''-tetrasulphonic acid having the formula

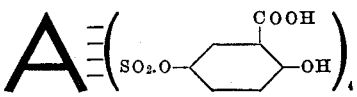

is a dark violet powder which dissolves in water with a blue coloration and in concentrated sulphuric acid with a green coloration.

When applied to pre-chromed cotton or by chrome printing on cotton the dyestuff yields a blue-green tint having very good properties of wet fastness and an excellent fastness to light.

By using instead of 65 parts of 1:4-dihydroxybenzene-5-carboxylic acid, 98 parts of 6-bromo-1:3-dihydroxy-4-carboxylic acid there is obtained a dyestuff which in chrome printing on cotton yields a blue green tint having very good properties of fastness.

Example 22

96.2 parts (1/10 mol) of iron phthalocyanine-4:4':4":4'''-tetrasulphochloride (obtained by the action of chlorosulphonic acid on iron phthalocyanine-4:4':4":4'''-tetrasulphonic acid) are mixed with 300 parts of broken ice, and a solution of 65 parts (4/10 mol) of 1:3-dihydroxybenzene-4-carboxylic acid and 34 parts of sodium hydroxide (100 per cent. strength) in 300 parts of water are added while stirring. The reaction mixture is stirred first for 5 hours at 5–10° C. and then for a further 12 hours at room temperature. From the resulting green-blue clear solution so obtained the dyestuff is salted out by means of sodium chloride.

The new dyestuff is a dark violet powder which dissolves in water with a blue-green coloration and in concentrated sulphuric acid with a grey coloration.

The new dyestuff is especially well suited for chrome printing on cotton. It yields powerful green-blue tints having excellent properties of fastness.

What I claim is:

1. A process for the manufacture of (ortho-hydroxy-carboxy)-phenyl esters of phthalocyanine tetrasulphonic acids, comprising reacting one molecular proportion of a phthalocyanine sulphonic acid chloride of the general formula

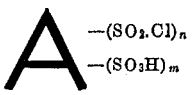

in which A represents a member selected from the group consisting of a halogenated metal-containing phthalocyanine molecule, the halogen having an atomic weight greater than 19 and less than 126, a phenylated metal-containing phthalocyanine molecule, an unsubstituted metal-free phthalocyanine molecule and an unsubstituted metal-containing phthalocyanine molecule, the —SO$_2$.Cl and —SO$_3$H groups being present in any one of the 3- and 4-positions, $m$ represents a number from 0 to 3, $n$ represents an integer from 1 to 4 and the sum of $m+n$ equals 4, in an aqueous medium and in the presence of a substance capable of neutralising a mineral acid with at least one molecular proportion of a dihydroxybenzene carboxylic acid of the general formula

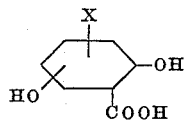

in which X represents a member selected from the group consisting of hydrogen, halogen, —OH, —CH$_3$ and —SO$_3$H.

2. A process for the manufacture of (ortho-hydroxy-carboxy)-phenyl esters of phthalocyanine tetrasulphonic acids, comprising reacting one molecular proportion of a phthalocyanine sulphonic acid chloride of the general formula

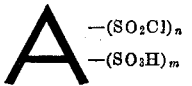

in which A represents a member selected from the group consisting of a halogenated metal-containing phthalocyanine molecule, the halogen having an atomic weight greater than 19 and less than 126, a phenylated metal-containing phthalocyanine molecule, an unsubstituted metal-free phthalocyanine molecule and an unsubstituted metal-containing phthalocyanine molecule, the —SO$_2$Cl and —SO$_3$H groups being present in any one of the 3- and 4-positions, $m$ represents a number from 0 to 3, $n$ represents an integer from 1 to 4 and the sum of $m+n$ equals 4, in an aqueous medium and in the presence of a substance capable of neutralising a mineral acid with three to four molecular proportions of a dihydroxybenzene carboxylic acid of the general formula

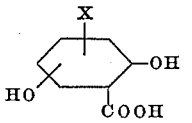

in which X represents a member selected from the group consisting of hydrogen, halogen, —OH, —CH$_3$ and —SO$_3$H.

3. A process for the manufacture of the sodium salt of the 3'-hydroxy-4'-carboxyphenyl ester of copper phthalocyanine-3:3':3":3'''-tetrasulphonic acid having the formula

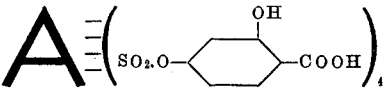

in which A represents the copper phthalocyanine-3:3':3":3'''-tetrasulphonic acid radical, comprising reacting one molecular proportion of copper phthalocyanine-3:3':3":3'''-tetrasulphonic acid chloride with 4 molecular proportions of 1:3-dihydroxybenzene-4-carboxylic acid in an aqueous medium and in the presence of a substance capable of neutralising a mineral acid.

4. A process for the manufacture of the sodium salt of the 3'-hydroxy-4'-carboxyphenyl ester of copper phthalocyanine-4:4':4":4'''-tetrasulphonic acid having the formula

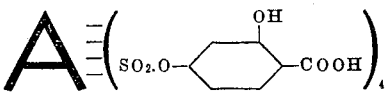

in which A represents the copper phthalocyanine-4:4':4":4'''-tetrasulphonic acid radical, comprising reacting one molecular proportion of copper phthalocyanine-4:4':4":4'''-tetrasulphonic acid chloride with 4 molecular proportions of 1:3-dihydroxybenzene-4-carboxylic acid in an aqueous medium and in the presence of a substance capable of neutralising a mineral acid.

5. A process for the manufacture of the sodium salt of the 3'-hydroxy-4'-carboxyphenyl ester of cobalt phthalocyanine-3:3':3":3'''-tetrasulphonic acid having the formula

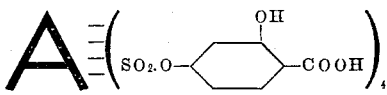

in which A represents a cobalt phthalocyanine-3:3':3":3'''-tetrasulphonic acid radical, comprising reacting one molecular proportion of cobalt phthalocyanine-3:3':3":3'''-tetrasulphonic acid chloride with 4 molecular proportions of 1:3-dihydroxybenzene-4-carboxylic acid in an aqueous medium and in the presence of a substance capable of neutralising a mineral acid.

6. A process for the manufacture of the potassium salt of the 4'-hydroxy-3'-carboxyphenyl ester of nickel phthalocyanine - 3:3':3":3''' - tetrasulphonic acid having the formula

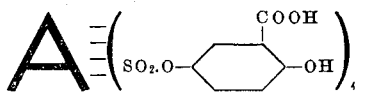

in which A represents the nickel phthalocyanine-3:3':3":3'''-tetrasulphonic acid radical, comprising reacting one molecular proportion of nickel phthalocyanine-3:3':3":3'''-tetrasulphonic acid chloride with 4 molecular proportions of 1:4-dihydroxybenzene-5-carboxylic acid in an aqueous medium and in the presence of a substance capable of neutralising a mineral acid.

7. A process for the manufacture of the sodium salt of the 4' - hydroxy - 3' - carboxyphenyl ester of nickel phthalocyanine-4:4':4":4''' - tetrasulphonic acid having the formula

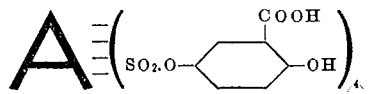

in which A represents the nickel phthalocyanine-4:4':4":4'''-tetrasulphonic acid radical, comprising reacting one molecular proportion of nickel phthalocyanine-4:4':4":4'''-tetrasulphonic acid chloride with 4 molecular proportions of 1:4-dihydroxybenzene-5 - carboxylic acid in an aqueous medium and in the presence of a substance capable of neutralising a mineral acid.

8. As new blue to green dyestuffs, the (ortho-hydroxy-carboxy)-phenyl esters of phthalocyanine tetrasulphonic acids having the general formula

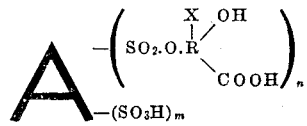

in which A represents a member selected from the group consisting of a halogenated metal-containing phthalocyanine molecule, the halogen having an atomic weight greater than 19 and less than 126, a phenylated metal-containing phthalocyanine molecule, an unsubstituted metal-free phthalocyanine molecule and an unsubstituted metal-containing phthalocyanine molecule, the

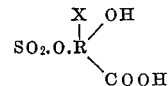

and $-SO_3H$ groups being present in any one of the 3- and 4-positions, $m$ represents a number from 0 to 3, $n$ represents an integer from 1 to 4 and the sum of $m+n$ equals 4, R represents a benzene nucleus in which the hydroxyl and carboxylic acid groups are in ortho-position relatively to one another and X represents a member selected from the group consisting of hydrogen, halogen, $-OH$, $-CH_3$ and $-SO_3H$.

9. As a new dyestuff, an alkaline metal salt of the 3'-hydroxy-4' - carboxyphenyl ester of copper phthalocyanine - 3:3':3":3''' - tetrasulphonic acid having the formula

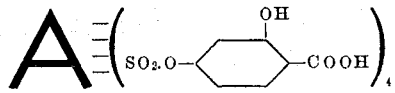

in which A represents the copper phthalocyanine - 3:3':3":3'''-tetrasulphonic acid radical.

10. As a new dyestuff, an alkaline metal salt of the 3'-hydroxy-4'-carboxyphenyl ester of copper phthalocyanine-4:4':4":4'''-tetrasulphonic acid having the formula

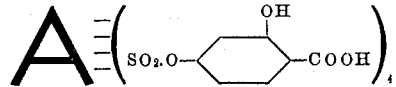

in which A represents the copper phthalocyanine-4:4':4":4'''-tetrasulphonic acid radical.

11. As a new dyestuff, an alkaline metal salt of the 3'-hydroxy-4' - carboxyphenyl ester of cobalt phthalocyanine - 3:3':3":3''' - tetrasulphonic acid having the formula

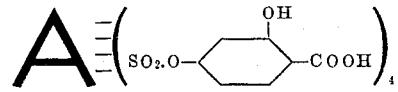

in which A represents the cobalt phthalocyanine-3:3':3":3'''-tetrasulphonic acid radical.

12. As a new dyestuff, an alkaline metal salt of the 4'-hydroxy-3'-carboxyphenyl ester of nickel phthalocyanine-3:3':3":3'''-tetrasulphonic acid having the formula

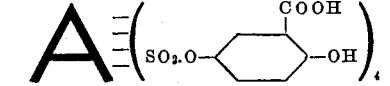

in which A represents the nickel phthalocyanine - 3:3':3":3'''-tetrasulphonic acid radical.

13. As a new dyestuff, an alkaline metal salt of the 4'-hydroxy-3' - carboxyphenyl ester of nickel phthalocyanine-4:4':4":4'''-tetrasulphonic acid having the formula

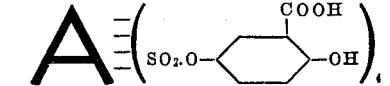

in which A represents the nickel phthalocyanine - 4:4':4":4'''-tetrasulphonic acid radical.

No references cited.